April 12, 1966 M. J. PRIEFERT 3,245,383
CHUTE GATE
Filed May 1, 1964 2 Sheets-Sheet 1
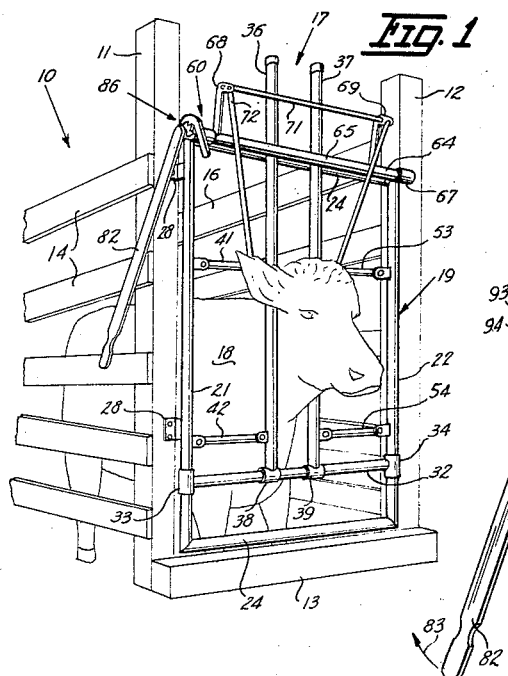
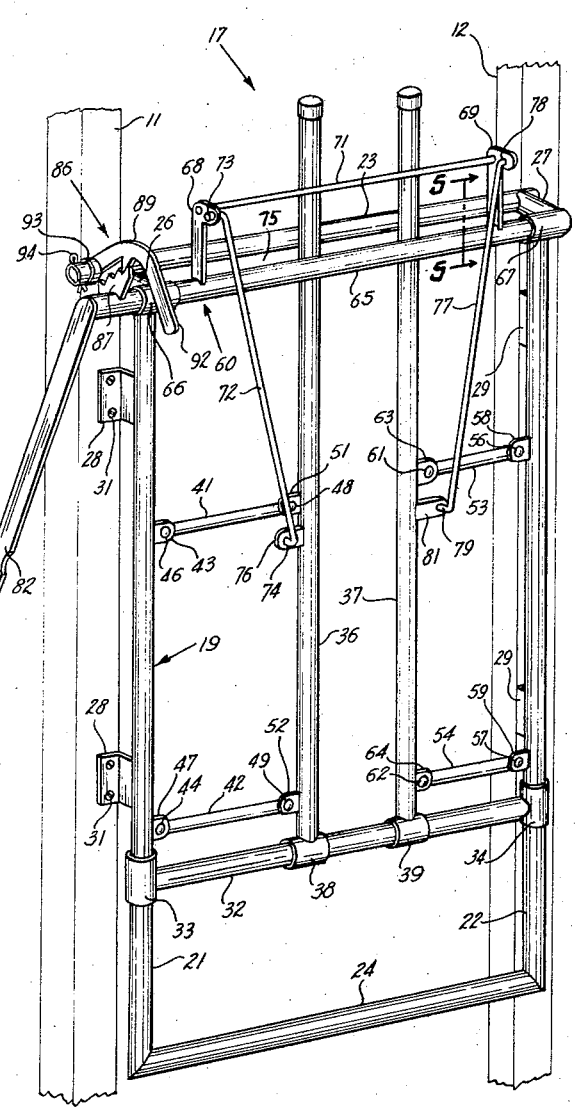
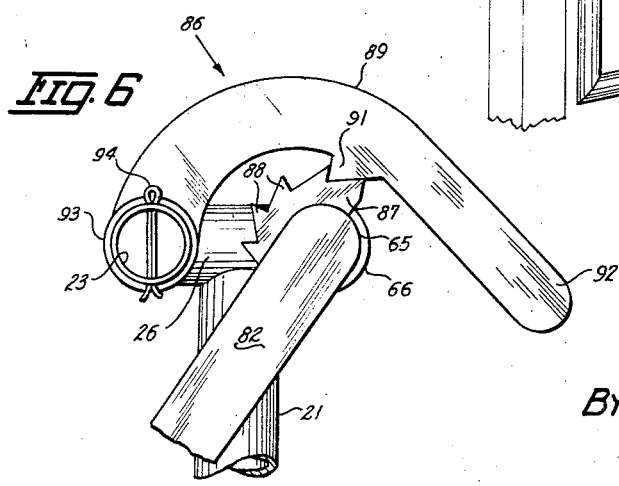
INVENTOR.
MARVIN J. PRIEFERT
BY Rudolph R. Powell
ATTORNEY.

April 12, 1966  M. J. PRIEFERT  3,245,383
CHUTE GATE
Filed May 1, 1964  2 Sheets-Sheet 2
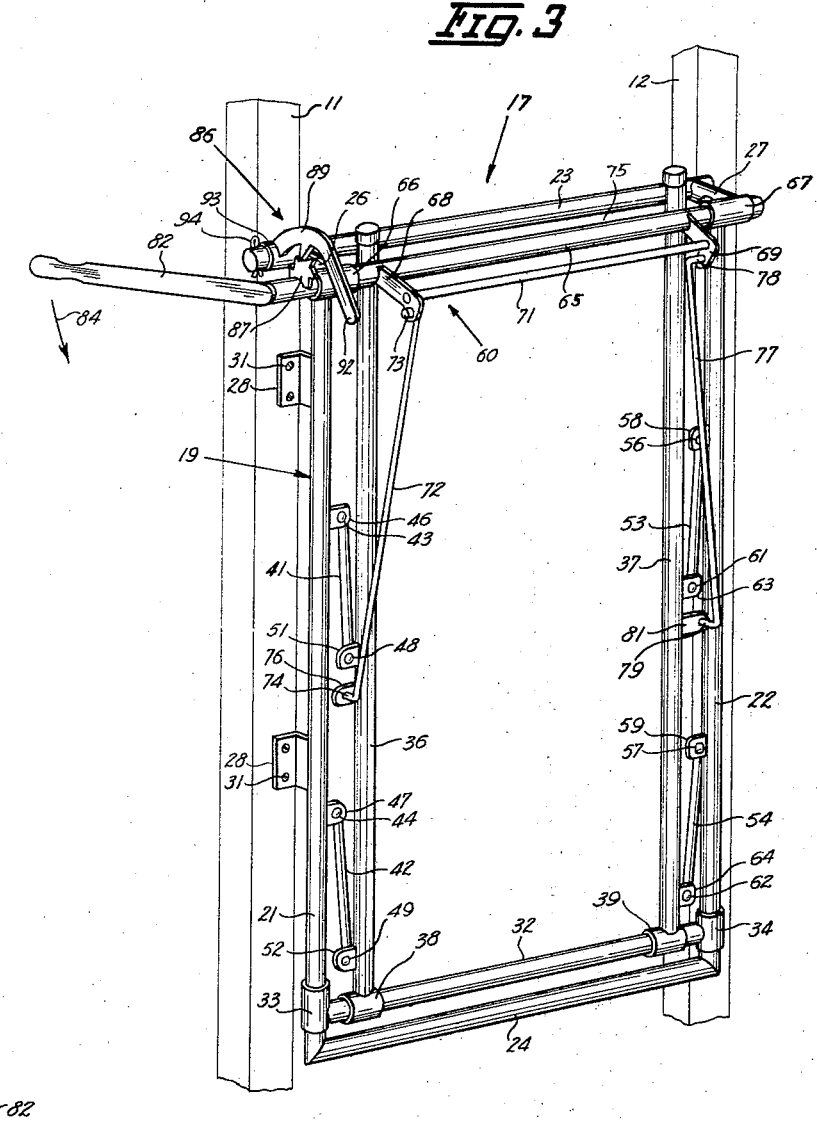
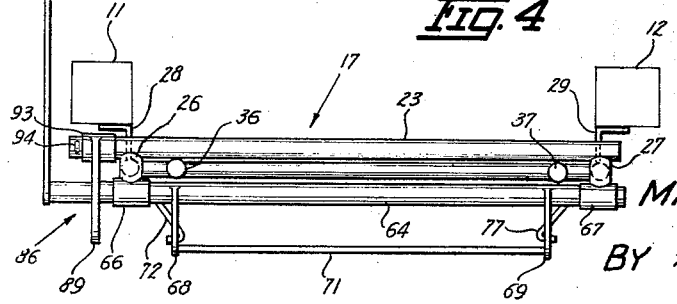
INVENTOR.
MARVIN J. PRIEFERT
BY
ATTORNEY.

United States Patent Office 3,245,383
Patented Apr. 12, 1966

3,245,383
CHUTE GATE
Marvin J. Priefert, R.R. 1, Mount Pleasant, Tex.
Filed May 1, 1964, Ser. No. 364,108
9 Claims. (Cl. 119—98)

This invention relates to an animal holding apparatus and more particularly to a chute gate for catching and holding livestock, such as cattle.

It is the object of this invention to provide an improved gate for holding cattle.

Another object of the invention is to provide a gate which is attachable to a cattle chute and movable to a closed position for engaging opposite portions of the neck of an animal and movable to an open position to allow the animal to pass through the gate.

A further object of the invention is to provide a gate adapted to hold animals of different sizes and shapes.

Still a further object of the invention is to provide a cattle holding gate which is operable by movement of a single lever to restrain and to release cattle.

An additional object of the invention is to provide a gate for holding cattle which is sturdy in construction, safe in use, and economical to manufacture and service.

The exact nature of the invention as well as other objects and advantages thereof will be readily apparent from the consideration of the following specification relating to the accompanying drawing, wherein:

FIG. 1 is a perspective view of a cattle chute equipped with the gate of this invention closed on the neck of an animal;

FIG. 2 is an enlarged perspective view of the gate of FIG. 1 in the closed position;

FIG. 3 is a view similar to FIG. 2 showing the gate in the open position;

FIG. 4 is a plan view of the gate of FIG. 3;

FIG. 5 is an enlarged sectional view taken along the line 5—5 of FIG. 2; and

FIG. 6 is an enlarged fragmentary side view of the latch mechanism for the gate of FIG. 2.

Referring to the drawing, there is shown in FIG. 1 a cattle chute 10 having a pair of spaced upright posts 11 and 12 secured to the ground. A transverse sill member 13 is positioned on the ground and is secured at its opposite ends to the posts 11 and 12. A plurality of vertically spaced horizontal rails 14 and 16 are secured to the sides of the posts 11 and 12 and corresponding rear posts (not shown) to form the upright side walls of the chute.

The gate of this invention indicated generally at 17 is secured to the posts 11 and 12 and is movable to a closed position into engagement with opposite side portions of the neck of an animal 18 and movable to an open position to allow the animal to pass through the chute. As shown in FIG. 2, the gate 17 comprises an upright rectangular-shaped frame 19 having a pair of substantially parallel vertical bar members 21 and 22 and upper and lower transverse members 23 and 24. The opposite ends of the lower transverse member 24 are secured to the lower ends of the vertical members 21 and 22. As shown in FIG. 1, the lower transverse member 24 is positioned immediately adjacent the top of the sill member 13 to provide maximum clearance for the animal as it moves through the gate 17.

The upper transverse member 23 is secured to the top ends of the vertical members 21 and 22 by horizontal arms 26 and 27 extended transversely of the vertical members 21 and 22. The arms 26 and 27 position the transverse member 23 at an elevation higher than the back of the animal 18 and rearwardly of the longitudinal plane of the vertical members 21 and 22.

The frame 19 is attached to the posts 11 and 12 by two pairs of angle brackets 28 and 29. Each pair of brackets 28 and 29 is vertically spaced and secured to the vertical members 21 and 22, respectively. Bolts 31 secure the angle brackets 28 and 29 to the posts 11 and 12.

A vertically movable cross bar 32 extends between the vertical frame members 21 and 22 substantially parallel to the lower transverse member 24. The opposite ends of the cross bar 32 are secured to sleeves 33 and 34 which are slidably mounted about the lower portions of the vertical frame members 21 and 22, respectively.

Positioned between the vertical frame members 21 and 22 are a pair of upright hold rods or pipes 36 and 37 having a length substantially equal to the length of the members 21 and 22. Sleeves 38 and 39 are movably mounted about the cross bar 32 and are secured to the lower ends of the rods 36 and 37 whereby to slidably connect each hold rod to the cross bar 32.

A first pair of vertically spaced links 41 and 42 pivotally connect the rod 36 with the frame member 21. The outer ends of the links 41 and 42 are pivotally attached by pins 43 and 44 to inwardly directed tabs 46 and 47 secured to the frame member 21. The inner ends of the links 41 and 42 are pivotally attached by pins 48 and 49 to outwardly directed tabs 51 and 52 secured to the rod 36.

A second pair of vertically spaced links 53 and 54 pivotally connect the rod 37 with the frame member 22. The outer ends of the links 53 and 54 are pivotally attached by pins 56 and 57 to inwardly directed tabs 58 and 59. In a like manner, the inner ends of the links 53 and 54 are pivotally attached by pins 61 and 62 to outwardly directed tabs 63 and 64 secured to the rod 37.

The links 41, 52, 53 and 54 are substantially equal in length and when extended transversely of the frame 19 position the rods 36 and 37 in a parallel spaced relation within the transverse median portion of the chute. When in this spaced relation and as shown in FIG. 1, the distance between the rods 36 and 37 is at a minimum to provide for their engagement with opposite portions of the neck of the animal 18. This minimum spacing between the rods 36 and 37 defines the closed position of the gate.

When the gate is in the open position, as shown in FIG. 3, the rods 36 and 37 are in a spaced parallel relation positioned adjacent corresponding ones of the vertical frame members 21 and 22. In this open gate position the links 41, 42, 53 and 54 project downwardly from their associated tabs 46, 47, 58 and 59, respectively, and the cross bar 32 is positioned adjacent the lower transverse frame member 24. The animal is thus free to move through the gate between the rods 36 and 37 and over the cross bar 32.

The rods 36 and 37 are moved from an open position as shown in FIG. 3 to a closed position as shown in FIG. 2 by a crank assembly indicated generally at 60. The crank assembly 60 comprises a transverse shaft 65 muonted in sleeve bearings 66 and 67 which are secured to the forward ends of the arms 26 and 27, respectively. The arms 26 and 27, transverse member 23 and shaft 65 thus form an open rectangular frame to define an elongated slot 75 for guidably receiving the upper ends of the hold or neck engaging rods 36 and 37.

Rock arms 68 and 69, secured to the shaft adjacent the bearings 66 and 67, are connected together by a brace rod 71. The free end of the arm 68 is connected to the mid-portion of the rod 36 by a rod member 72. The upper end of the rod member 72 has a short hook 73 projected through a hole in the free end of the arm 68. The opposite end of the rod member 72 has a hook 74 projected through a hole in a tab 76 secured to the rod 36. In like manner the free end of the arm 69 is connected by a rod member 77 to the mid-portion of the rod 37. The upper end of the rod member 77 has a hook 78 projected through a hole in the free end of the arm 69, and its lower end has a hook 79 projected through a hole in a tab 81 secured to the rod member 37.

A handle 82 is secured to one end of the shaft 65. The gate is operated between its open and closed positions by movement of the handle 82 in the direction of the arrows 83 and 84 as shown in FIGS. 2 and 3. Referring to the open position of the gate in FIG. 3, when the handle 82 is moved in a downward direction the shaft 65 is rotated to move the arms 68 and 69 in an upward direction. In turn the rod members 72 and 77 move the neck engaging rods 36 and 37 upwardly within the slot 75, between the upper transverse frame member 23 and the shaft 65, toward each other to their positions shown in FIG. 2. The frame member 23 and shaft 65 thus function as guides for the rods 36 and 37. The upward movement of the rods 36 and 37 carries the transverse cross bar 32 upwardly to a position adjacent the tabs 47 and 59.

The neck engaging rods 36 and 37 and the cross bar 32 are maintained in their closed position shown in FIG. 2 by a lock mechanism indicated generally at 86. As shown in FIG. 6, the lock mechanism 86 comprises an upright ratchet 87 secured to the shaft 65 adjacent the handle 82, and formed with a plurality of forwardly inclined teeth 88. A pawl 89 having a downwardly projected tooth 91 and a handle 92 coacts with the ratchet 87 to hold the shaft 65 in a selected rotated position. The pawl 89 has a tubular hub 93 rotatably mounted on one end of the upper transverse frame member 23 outwardly from the arm 26. A cotter key 94 projects diametrically through such end of the transverse member 23 and in conjunction with the arm 26 functions to limit the movement of the pawl 89 axially of the transverse member 23.

In use, the animal 18 enters the rear of the chute 10 between the side rails 14. The gate 17 is partially closed so as to prevent the animal from moving through the chute 10, but with the neck engaging members or rods 36 and 37 spaced apart a sufficient distance to permit the head of the animal to pass therebetween. When the neck of the animal is between the rods 36 and 37 the lever 82 is moved in a downward direction, as indicated by the arrow 84 in FIG. 3, to rotate the crank assembly 60 which in turn moves the neck engaging rods 36 and 37 upwardly and inwardly toward each other and into engagement with the opposite sides of the neck of the animal 18.

The upward movement of the rods 36 and 37 carries the cross bar 32 upwardly to its position as shown in FIG. 1 adjacent the shoulders of the animal 18. The pawl 89 being extended over the ratchet 87 is maintained by gravity in engagement with the teeth 88. As shown in FIG. 6, the tooth 91 of the pawl 89 coacts with the teeth 88 of the sector rack plate 87 to inhibit the rotation of the shaft 65 in a clockwise direction as viewed in FIG. 6. Thus, the pawl and rack plate 87 lock the neck engaging members 36 and 37 in their closed position shown in FIG. 2.

In order to release the animal 18 from the gate the locking mechanism 86 is disengaged by raising the pawl tooth 91 out of engagement with the rack teeth 88. This is manually accomplished by applying an upward force on the pawl handle 92.

After the locking mechanism 86 is released the neck engaging members 36 and 37 move downwardly and outwardly, simultaneously with the downward movement of the cross member 32 on the frame members 21 and 22. The sleeves 38 and 39, secured to the lower end of the neck engaging members 36 and 37, slide along the cross bar 32 toward the opposite ends thereof as shown in FIG. 3. This operation of the gate to its open position in FIG. 3 takes place under the influence of gravity. When the gate is open the animal passes therethrough between the neck engaging rods 36 and 37 and over the cross bar 32.

In summary, the gate 17 has a pair of upright neck engaging members or hold rods 36 and 37 slidably connected to a transverse cross bar 32. Each neck engaging member is pivotally connected to an upright frame member by a pair of links. The neck engaging members 36 and 37 are moved to a closed position by a crank assembly 60 which operates to raise the neck engaging members 36 and 37. On upward movement of the neck engaging members 36 and 37 the pairs of links 41, 42 and 53, 54 are carried to substantially horizontal positions so as to move the neck engaging members 36 and 37 toward the transverse median portion of the chute.

This position of the neck engaging members 36 and 37 is maintained by a lock mechanism 86 which fixes the location of the crank assembly 60 and thereby prevents the neck engaging members 36 and 37 from falling downwardly to their open position as shown in FIG. 3. On downward movement of the neck engaging members 36 and 37 and the cross bar 32, the links 41, 42 and 53, 54 move the neck engaging members 36 and 37 in opposite outward directions away from each other to a position adjacent and substantially parallel to corresponding upright frame members 21 and 22.

While there have been shown, described and pointed out the fundamental novel features of the invention, it is to be understood that various omissions, substitutions, changes in form, and details of the animal holding gate illustrated may be made by those skilled in the art without departing from the spirit of the invention which is intended to be limited only as indicated by the scope of the following claims.

I claim:
1. An animal holding gate comprising:
   (a) an upright main frame having a pair of transversely spaced upright posts and a cross member secured to the upper end sections of the posts,
   (b) a transverse member slidably mounted for up and down movement on the lower end sections of the posts,
   (c) a pair of upright animal neck engaging members having upper end portions positioned adjacent said cross member and lower end portions slidably connected to the transverse member for movement longitudinally thereof,
   (d) link means corresponding to and connecting a neck engaging member to an adjacent post for vertical and lateral movement of the neck engaging member relative to the post, each of said link means being pivotally connected to a corresponding post and neck engaging member,
   (e) a transverse shaft rotatably mounted on the upper end sections of the posts, said shaft being spaced from said cross member and forming with said cross member a guideway for the upright neck engaging members,
   (f) a pair of arm means secured to and projected laterally from the shaft,
   (g) means pivotally connected to an arm means and a neck engaging member,
   (h) handle means secured to said shaft and movable to rotate said shaft whereby the neck engaging members are displaced upwardly and toward one another to a closed position and the transverse member is moved upwardly, and
   (i) latch means for holding the neck engaging members in said closed position.

2. An animal holding gate comprising:
   (a) an upright main frame having a pair of transversely spaced upright posts and a cross member secured to the upper end sections of the posts,
   (b) a transverse member slidably mounted for up and down movement on the lower end sections of the posts,
   (c) a pair of upright animal neck engaging members movable to an open position and a closed position, said members having upper end portions positioned adjacent said cross member and lower end portions slidably connected to the transverse member for movement longitudinally thereof, (d) link means connecting each of said neck engaging members to an adjacent post for vertical and lateral movement of the neck engaging members relative to the posts, said link means being pivotally connected to the posts and neck engaging members, (e) a transverse shaft rotatably mounted on the upper end sections of the posts, said shaft being spaced from said cross member and forming with said cross member a guideway for the upright neck engaging members, and (f) means coupling said shaft with the neck engaging members whereby upon rotation of the shaft the neck engaging members are movable in a vertical direction and toward and away from each other while simultaneously vertically moving the transverse member.

3. An animal holding gate comprising:

(a) an upright main frame having a pair of substantially parallel transversely spaced upright posts, (b) a transverse member slidably mounted for up and down movement on the lower portions of the posts, (c) a pair of upright animal neck engaging members having lower ends slidably connected to the transverse member for movement longitudinally thereof, (d) vertically spaced links connecting each of said neck engaging members to an adjacent post for vertical and lateral movement of the neck engaging members relative to the posts, said links being pivotally supported on the posts for vertical swinging movement and being movable downwardly by gravity to move the neck engaging members downwardly and away from one another and the transverse member downwardly, and (e) means mounted on the upper portions of the posts for moving said neck engaging members upwardly and toward one another and simultaneously moving the transverse member in an upward direction.

4. In an animal holding gate, (a) upright frame means, (b) a transverse member slidably mounted for up and down movement on said frame means, (c) at least one upright neck engaging member having a lower end portion slidably connected to the transverse member for movement longitudinally thereof, (d) link means connecting said neck engaging member to the frame means for vertical and lateral movement of the neck engaging member relative to the frame means, and (e) means mounted on the frame means for moving said neck engaging member vertically and laterally while simultaneously vertically moving the transverse member.

5. The animal holding gate defined in claim 4 wherein said means for displacing the neck engaging member comprises:

(a) a transverse shaft rotatably mounted on the upper portion of the frame means, (b) arm means secured to and projected laterally from the shaft, (c) means for connecting the arm means and the neck engaging member, and (d) handle means secured to said shaft and movable to rotate said shaft whereby the neck engaging member is moved vertically and laterally while simultaneously vertically moving the transverse member.

6. An animal holding gate comprising:

(a) an upright main frame having a pair of spaced upright posts and a cross member secured to the upper end sections of the posts, (b) a transverse support bar slidably mounted for vertical movement on the lower portions of said posts, (c) a pair of upright neck engaging members disposed between said upright posts in spaced relation to one another, said neck engaging members having a lower portion slidably connected to the support bar for movement longitudinally thereof, (d) link means connecting each of said neck engaging members to an adjacent post for vertical and lateral movement of the neck engaging members relative to the posts, and (e) means mounted on the frame for displacing said neck engaging members upward and toward each other and simultaneously moving said support bar vertically upward on said posts to define with said cross member a minimum animal receiving opening within said main frame.

7. The animal holding gate as defined in claim 6 in which:

(a) said displacing means further operable to provide for the movement of said neck engaging members downwardly under gravity to a position adjacent the upright posts simultaneously with the movement of said support bar vertically downward to a position adjacent the lower portion of said upright posts to define with said cross member a maximum animal receiving opening within said main frame.

8. The animal holding gate as defined in claim 6 including:

(a) a transverse shaft rotatably mounted on the upper end sections of the posts, said shaft being spaced from said cross member and forming with said cross member a guideway for the upright neck engaging members, (b) means operably connecting said shaft and said neck engaging members, (c) handle means secured to said shaft and movable to rotate said shaft and move said neck engaging members vertically and laterally simultaneously with movement of said support bar vertically, and (d) latch means for holding the neck engaging members in said minimum opening position.

9. The animal holding gate as defined in claim 8 in which:

(a) said latch means has a first lock member operably connected to said handle means and a second lock member secured to said main frame whereby said second lock member is operable to positively lock said handle means and said main frame against relative movement.

References Cited by the Examiner
UNITED STATES PATENTS

| | | | |
|---|---|---|---|
| 1,549,245 | 8/1925 | Currie | 119—147 |
| 2,591,191 | 4/1952 | Osmetti | 119—99 |
| 2,678,631 | 5/1954 | Hagar | 119—99 |
| 2,680,425 | 6/1954 | Hagel | 119—98 |

MELVIN D. REIN, *Primary Examiner.*

HUGH R. CHAMBLEE, *Examiner.*